William W. Patterson
and
Edmond Bishop's
Improvement in Ratchet Coupling for Boats Sheet A
Sheet 1 - 2 Sheet

111564

Patented Feb 7 1871

Witnesses
Andrew Humbert
A. C. Johnston

Inventors
William W. Patterson
Edmond Bishop 111,564

2 Sheets. Sheet

Sheet B

UNITED STATES PATENT OFFICE.

WILLIAM W. PATTERSON AND EDMOND BISHOP, OF PITTSBURG, PA.

IMPROVEMENT IN RATCHET-COUPLINGS FOR BARGES, &c.

Specification forming part of Letters Patent No. 111,564, dated February 7, 1871.

*To all whom it may concern:*

Be it known that we, WILLIAM W. PATTERSON and EDMOND BISHOP, both of Pittsburg, in the county of Allegheny and State of Pennsylvania, have invented a new and useful Improvement in "Ratchet for Coupling Boats;" and we do hereby declare that the following is a full and exact description thereof, reference being had to the accompanying drawing, and to the letters of reference marked thereon.

The nature of our invention consists in the combination and arrangement of a shaft, ratchet-wheel, operating-lever, double-headed pawl, draft-rods, and hooks, so constructed and arranged with relation to each other as to form a ratchet for coupling boats together.

To enable others skilled in the art to make and use our invention, we will proceed to describe more fully its construction and operation.

Figure 1:
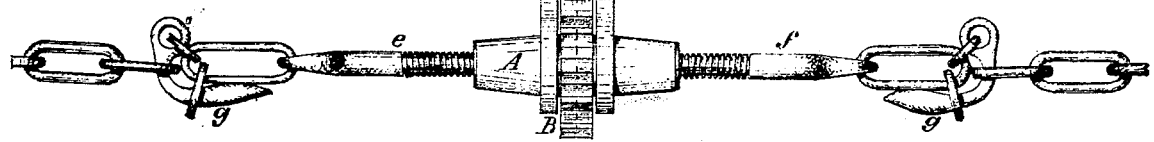
Figure 2:
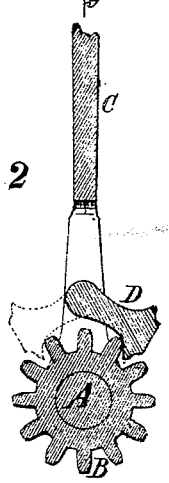
Figure 3:
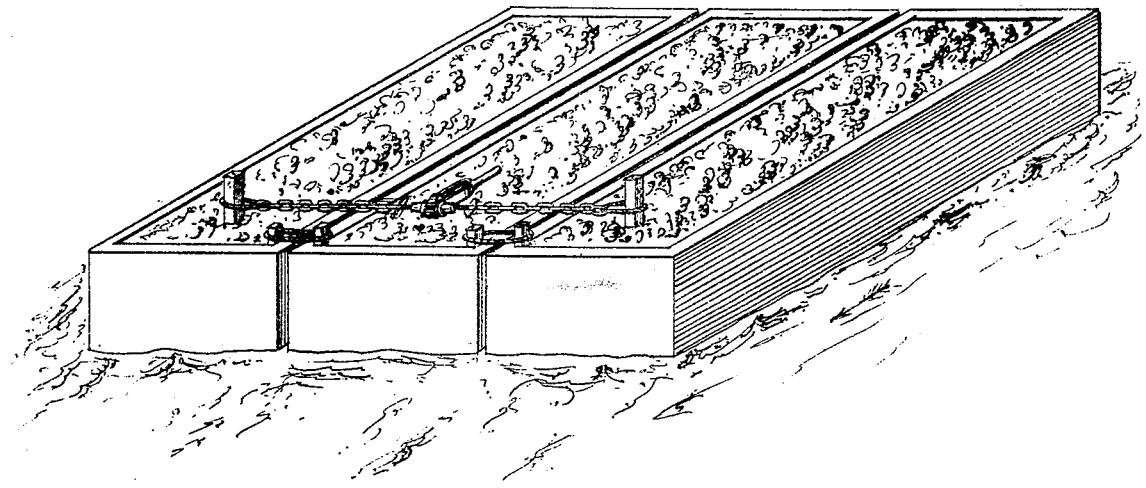

In the accompanying drawing, which forms part of our specification, Figure 1, Sheet A, is a top view of our improvement in ratchet for coupling boats together. Fig. 2 represents a section of the same when cut through at line *y* of Fig. 1. Fig. 3, Sheet B, represents the manner of applying the ratchet in coupling boats together.

In the accompanying drawing, A represents a shaft armed with a wheel, B, and pivoted in a lever, C. In the ends of the shaft A are fitted draft-rods *e* and *f*, provided with screw-threads, which are fitted to screw-threads in the shaft A. The screw-threads of the draft-rods and shaft A are so constructed that they form what is termed "right-and-left screws," so that in rotating the shaft A in one direction the draft-rods will be drawn in toward the wheel B, and by rotating it in an opposite direction they will be forced out from the wheel B. The draft-rods *e* and *f* are provided with hooks *g*, for attaching them to the chains or ropes used for securing and drawing the boats together. These hooks are of ordinary construction, and are readily attached to and detached from the chains or ropes.

The ratchet-coupling hereinbefore described is used for drawing and holding together boats used for transporting coal on the western rivers of our country. One form of such boats is shown in Fig. 3 of Sheet B. These boats are lashed together in "fleets," and drawn close together by ropes, which often stretch or become slack, which allows the boats to separate, so as to leave a space between them. This will impede the moving of the boats in the water, and make them hard to control in their movements in the stream.

Through the medium of the ratchet hereinbefore described the boats can be kept close together by taking up the slack in the ropes. This is accomplished by giving the lever C a reciprocating motion, which will cause the pawl D to move the wheel B, which will rotate the shaft A, and thereby draw the draft-rods in toward the wheel B.

Having thus described the nature, construction, and operation of our improvement, what we claim as our invention is—

The shaft A, wheel B, and lever C, provided with pawl D, combined with rods *e* and *f*, arranged and operating with relation to each other, as and for the purpose herein described.

WILLIAM W. PATTERSON.
EDMOND BISHOP.

Witnesses:
ANDREW HUMBERT,
A. C. JOHNSTON.